(12) United States Patent
Beauchamp et al.

(10) Patent No.: US 6,465,902 B1
(45) Date of Patent: Oct. 15, 2002

(54) CONTROLLABLE CAMBER WINDMILL BLADES

(75) Inventors: Charles H. Beauchamp, Jamestown; William H. Nedderman, Jr., Middletown, both of RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/837,746

(22) Filed: Apr. 18, 2001

(51) Int. Cl.$^7$ ................................................. B64L 27/00
(52) U.S. Cl. ......................... 290/55; 290/1 R; 244/215; 416/155
(58) Field of Search .......................... 290/1 R, 44, 43, 290/54, 55; 244/215; 416/155

(56) References Cited

U.S. PATENT DOCUMENTS

| | | | | |
|---|---|---|---|---|
| 5,062,175 A | * | 11/1991 | Buchanan et al. | 15/250.203 |
| 6,065,934 A | * | 5/2000 | Jacot et al. | 244/75 R |
| 6,138,956 A | * | 10/2000 | Monner | 244/215 |
| 6,142,425 A | * | 11/2000 | Armanios et al. | 239/562 |
| 6,394,397 B1 | * | 5/2002 | Ngo et al. | 244/198 |

* cited by examiner

*Primary Examiner*—Nicholas Ponomarenko
(74) *Attorney, Agent, or Firm*—Michael J. McGowan; Frithvi C. Lall; Michael F. Oglo

(57) ABSTRACT

The present invention relates to a windmill power generation system which includes at least two variable camber blades fastened to a rotatable hub, which blades are driven by a fluid such as wind. Each of the variable camber blades has embedded shape memory alloy members. The system also includes a source of electrical power connected to the shape memory alloy members for varying the shape of the blades in response to changes in the speed of the fluid driving the blades. The power generating system further includes a power regulator connected to the electrical power source for regulating the electrical power being supplied to the shape memory alloy members and a controller for transmitting a power command signal to the power regulator. The controller preferably comprises a preprogrammed computer having an algorithm for generating the optimum blade shape for a particular wind speed or condition.

19 Claims, 3 Drawing Sheets

CONTROLLABLE CAMBER WINDMILL BLADES

STATEMENT OF GOVERNMENT INTEREST

The invention described herein may be manufactured and used by or for the Government of the United States of America for Governmental purposes without the payment of any royalties thereon or therefore.

BACKGROUND OF THE INVENTION (1) Field of the Invention

The present invention relates to an improved windmill system for generating electrical power which uses a controllable camber blade system.

(2) Description of the Prior Art

Variable camber airfoils have been known for quite some time. As a result, there are numerous patents related to flexible control surfaces for directing fluid flow. For example, U.S. Pat. No. 5,114,104 to Cincotta et al. relates to an articulated control surface which utilizes a moldable control surface that is shaped by contracting and elongating shape memory alloys embedded within the control surface. The shape memory alloys within the control surface contract when heated via an applied electric current and elongated when cooled, i.e. the electric current is removed.

U.S. Pat. No. 5,662,294 to Maclean et al. is another example of a control surface which uses a variable camber design. In this invention, a pliant controllable contour control surface comprises a first flexible facesheet formed to a first initial contour of the control surface, and a second flexible facesheet formed to a second initial contour of the control surface. The first and second facesheets each have a set of prestrained shape memory alloy tendons embedded therein, extending from a leading edge to a trailing edge of the control surface. Each set of the shape memory alloy tendons is separately connected to a controllable source of electrical current such that tendons of the first and second flexible facesheets can be selectively heated in an antagonistic, slack-free relationship, to bring about a desired modification of the configuration of the control surface. A computer based control system is used for maintaining a constant temperature of the antagonists to establish conditions conducive to the stress induced transformation from austenite to martensite, accomplished by causing constant current to flow through the antagonists.

Flexible control surfaces are an advance over the previous art of rigid control surfaces in that they allow control of the fin camber (curvature) as well as angle of attack (pitch). Camber can be used to control flow separation, to increase lift for a given surface area, and to reduce turbulence and noise.

Windmills are alternative energy sources with low environment impact and have been around for many centuries. Numerous attempts have been made over the years to improve the performance of windmills. U.S. Pat. No. 4,003,676 to Sweeney et al.; U.S. Pat. No. 4,160,170 to Harner et al.; U.S. Pat. No. 4,310,284 to Randolph; and U.S. Pat. No. 4,364,708 to David illustrate some of these efforts.

The Sweeney et al. patent relates to a windmill blade that has a rigid leading edge, a rigid root portion, and a movable blade tip. Control of the geometric twist of the windmill blade is accomplished through selection of the axis of rotation for the movable blade tip and by controlling the position of the windmill blade tip with a servo motor or by controlling the position of the windmill blade tip with a spring and a weight. By varying the geometric twist of the blade, the frequency of rotation of the blade is controlled to reduce wind drag upon the blade.

The Harner et al. patent relates to a wind turbine which is connected to an electrical generator to produce electrical power. The pitch angle of the wind turbine blades is controlled in a closed loop manner to maintain either a constant generator speed for isolated power generating stations or when the generator is synchronized to the load, or constant generator output power or shaft torque when the generator is connected to an electrical grid. Open loop acceleration and deceleration schedules are provided to minimize blade stress and shaft torque variations during start up and shutdown transients, limiting blade angle excursions as a function of wind velocity and speed.

The Randolph patent relates to a propeller hub which carries pivotally-mounted blades that are linked to a spring-loaded collar on the propeller shaft for automatic coning and feathering under predetermined high velocity movements along the propeller shaft to change the blade pitch angle during low wind velocity conditions. An airfoil support mounts a propeller shaft and turns therewith to reduce tower shadow effects. This is called a down-wind system meaning the propeller is behind the tower and causes the assembly to rotate into the wind without a tail vane.

The David patent relates to a windmill having blades with both variable pitch and variable spanwise twist. The windmill includes a hub which may be supported on top of a tower for rotation about a substantially horizontal axis. A plurality of blades are provided, each having a root, a tip and a spanwise twistable intermediate section. Linkage mechanisms connect the roots of the blades to the hub to permit selective independent rotation of the roots and the tips of the blades for varying the pitch and the spanwise twist of the blades. A control mechanism is connected to the linkage mechanisms for varying the pitch and spanwise twist of the blades in accordance with a predetermined desired relationship. The aerodynamic properties of the blades are adjusted by the control mechanism to permit the most efficient generation of electric power under most wind conditions, while minimizing the extent of the supporting tower structure necessary to accommodate heavy wind conditions.

As shown in these patents, windmills are configured with two or more blades fastened to a hub. The windmill blades have airfoil cross sections. When wind blows past the blades, it creates lift on the blades, which causes the hub to rotate. The hub spins an electrical generator which produces electrical power. The wind speed at which windmills can practically produce power is limited. At low speeds, the lift on the blades is insufficient to spin the hub and generator. At high speeds, the blades produce high lift that causes windmill spin at a high rate that can cause excessive stresses which damage and potential catastrophically fail the system.

SUMMARY OF THE INVENTION

Accordingly, it is an object of the present invention to provide a wind operated power generation system that has improved efficiency over a broad range of wind conditions.

It is a further object of the present invention to provide a wind operated power generation system as above which extends the range of wind speeds at which energy can be practically produced.

The foregoing objects are attained by the wind operated power generation system of the present invention.

In accordance with the present invention, a wind operated power generation system broadly comprises at least two variable camber blades fastened to a rotatable hub. Each of the variable camber blades comprises a flexible material having embedded shape memory alloy members to alter the shape of the blade. The power generation system further comprises a source of electrical power connected to the shape memory alloy members for varying the temperature of each shape memory alloy member and thereby the shape of the blades in response to changes in the speed of the fluid driving the blades. The system still further comprises a power regulator connected to the source of electrical power for regulating the electrical power supplied to the shape memory alloy members and a controller for transmitting a power command signal to the power regulator.

Other details of the wind operated power generation system of the present invention, as well as other objects and advantages attendant thereto, are set forth in the following detailed description and the accompanying drawings in which like reference numerals depict like elements.

DETAILED DESCRIPTION OF THE PREFERRED EMBODIMENT(S)

In the windmill power generation system of the present invention, the camber and the pitch of the windmill blades are adjusted to increase the lift at low speeds and decrease the lift at high speeds. This has two effects. First, it increases the range of wind speeds at which the windmill can practically produce energy. Secondly, at any specific wind speed, the blade's shape is optimized for that speed and thus, the overall efficiency of the power generation system can be improved.

Figure 1:
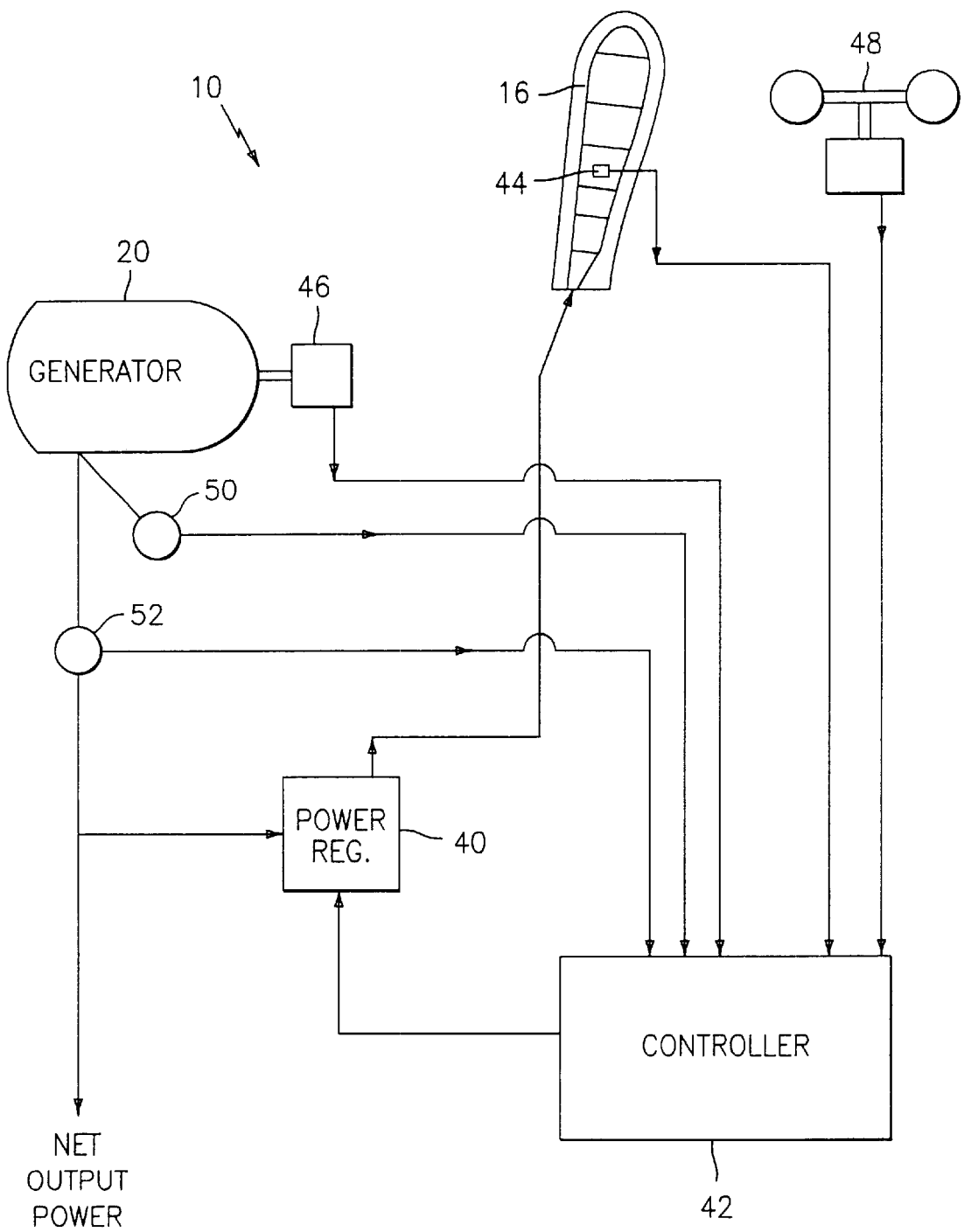
FIG. 1 is a schematic illustration of a wind operated power generation system in accordance with the present invention utilizing controllable camber windmill blades.

A wind operated power generation system 10 in accordance with the present invention is schematically illustrated in FIG. 1. The power generation system 10 comprises a hub 12 supported for rotation about a vertical axis on a tower 14 and at least two variable camber blades 16 attached to the hub 12 for rotation about an axis at an angle, typically a right angle, to the vertical axis. The system further comprises an electrical generator 20 mounted within the hub 12 and driven by the blades 16. The electrical generator 20 may comprise any conventional electrical generator known in the art and may be connected to the blades 16 using any suitable connection technique known in the art.

Figure 2A:
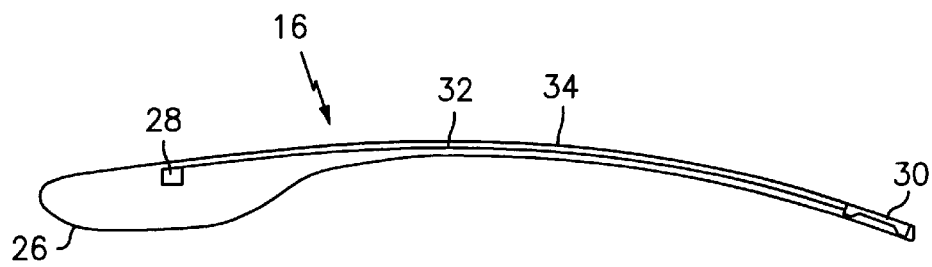
FIG. 2A is a cross sectional view of a controllable camber windmill blade in accordance with the present invention during low winds.
Figure 2B:
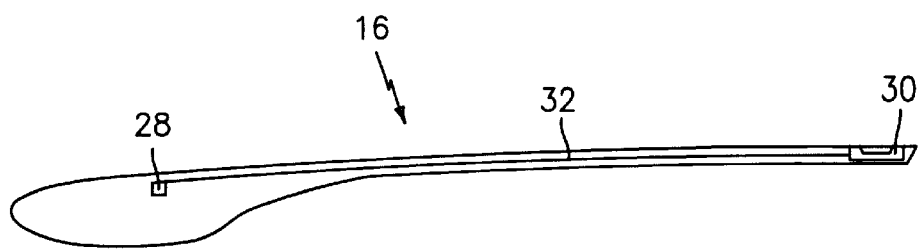
FIG. 2B is a cross sectional view of a controllable camber windmill blade in accordance with the present invention during high winds.
Figure 3:
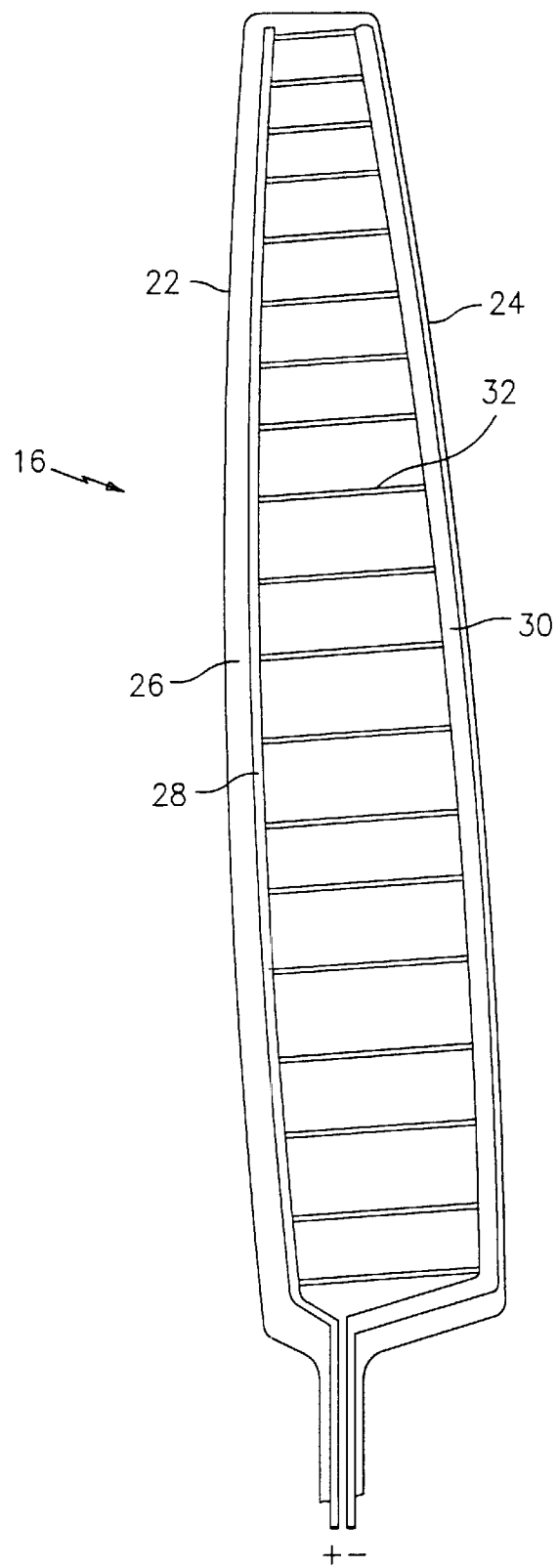
FIG. 3 is a plan view of a controllable camber windmill blade in accordance with the present invention.

Referring now to FIGS. 2A, 2B, and 3, each of the blades 16 has a leading edge 22 and a trailing edge 24. The main spar 26 for each blade 16 is preferably located in the leading edge. Embedded in the spar 26 is a round or rectangular electrical supply bus 28. Embedded in the trailing edge 24 of each blade 16 is a flat thin strip 30 which also forms an electrical bus. The strip 30 is utilized to maintain the shape of the trailing edge 24. A plurality of shape memory alloy members 32 extend in a spanwise direction. Each of the members 32 comprises a wire or sheet formed from a shape memory alloy such as a nickel-titanium shape memory alloy known commercially as NITINOL. Each shape memory alloy member 32 is electrically connected to the leading edge bus 28 and the trailing edge bus 30. A flexible material 34 covers each blade 16 and extends from the leading edge 22 to the trailing edge 24 on both the upper and lower surfaces of the blade. The flexible material may be formed from any suitable flexible composite material such as a urethane-fiberglass composite material or a urethane-spring steel composite material. The composite material which is used to form material 34 should exhibit stiffness in a spanwise direction. In a preferred embodiment of the present invention, the shape memory alloy members 32 are embedded within the flexible material 34.

When electrical power is supplied to the bus 28 during low wind conditions, the shape memory alloy members 32 become heated and contract to change shape so as to increase the radius of curvature and pitch of the blade as shown in FIG. 2A. Thereafter, as the winds increase and it becomes necessary to optimize the shape of the blade for high wind conditions, electrical power to the shape memory alloy members 32 is reduced or even cut off. This causes the shape memory alloy members 32 to cool and stretch. As a result, the blade 16 has a reduced curvature such as shown in FIG. 2B. In this embodiment, the shape memory wire would be located on the concave side of the curve. Decreasing the radius of curvature in this way has the effect of increasing both the camber and pitch of the blade. Increases in both pitch and camber will increase the lift on the blade, thus increasing the energy extracted from the wind at low wind speed.

In the system 10, the electrical power for heating the shape memory alloy members 32 comes from the electrical generator 20. In order to insure that a proper level of electrical power is supplied to the members 32 to optimize the shape of the blades 16 for a particular wind speed or wind condition, a power regulator 40 is incorporated into the system 10. The power regulator 40 is operated in response to a power command signal generated by a controller 42. The controller 42 may comprise any suitable preprogrammed computer known in the art.

Referring back to FIG. 1, the system 10 includes a number of sensors for providing the controller 42 with the information it needs to generate the command signal to the regulator 40. First, a strain sensor 44 is embedded in each of the blades 16 to generate a first signal indicative of the shape of the blade(s). Each sensor 44 may comprise any suitable strain sensor known in the art for measuring the amount of deflection of the blade in which it is embedded. Second, a sensor 46 is connected to the generator 20 to provide a second signal indicative of the rotational speed of the generator 20. The rotational speed sensor 46 may comprise any suitable sensor known in the art.

The system further includes a wind sensor 48 for providing a third signal to the controller 42 indicative of wind speed. The wind sensor 48 may comprise any suitable wind sensor known in the art. The wind sensor 48 may be mounted on or near the tower 14. The system 10 also includes a voltage sensor 50 for generating a fourth signal indicative of generator voltage output and a fifth sensor 52 for generating a fifth signal indicative of generator current output. As shown in FIG. 1, the fourth and fifth signals are supplied to the controller 42. The sensors 50 and 52 may comprise any suitable sensors known in the art. The outputs of the sensors 50 and 52 are utilized by the controller 42 to compute the power being produced by the generator 20.

The controller 42 is preprogrammed with a control algorithm for regulating the shape of the blades 16 by sending a command signal to the power regulator 40. That is, an optimum shape for each blade 16 for a particular wind condition is derived using the sensed wind speed, rotational speed, and/or generator power output. The computer algorithm may comprise any suitable algorithm known in the art and does not itself form part of the present invention. The particular algorithm which is used by the controller 42 may utilize all of the input signals provided to the controller 42 or it could be based on any one, or any pair, of the input signals provided to the controller 42. If the algorithm is based on less than all of the input signals, one or more of the sensors may be eliminated to save cost. Of course, the sensor which is eliminated is the one which produces the input signal that is not used. After the optimum blade shape has been determined by the preprogrammed controller 42, it is compared to the sensed blade shape. The controller 42 then adjusts the command signal to the regulator 40 until the blade shape sensors 44 indicate that an optimum blade shape has been obtained for a particular wind speed or condition.

Figure 4:
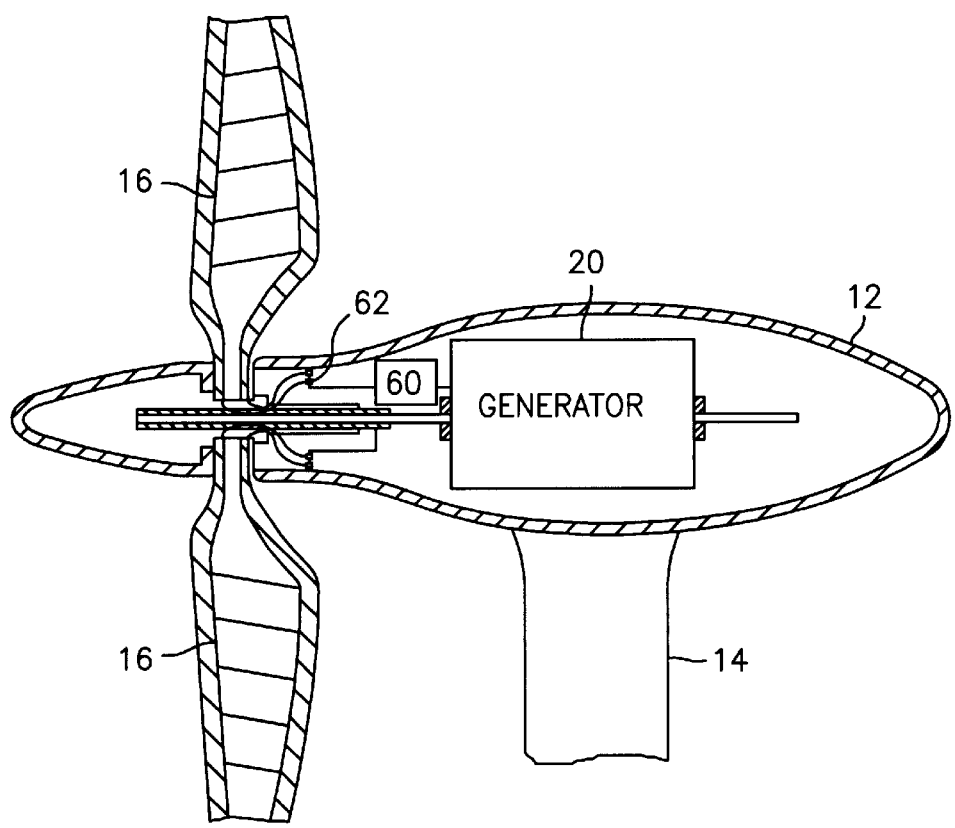
FIG. 4 is a sectional view of controllable camber windmill blades mounted to a hub.

Referring now to FIG. 4, slip rings 62 are located in the hub 12. The slip rings 62 are provided to transmit the electricity received from the power regulator 40 to the leading edge bus 28 and then to the shape memory alloy members 32 to change the camber of the blades 16.

The windmill power generation system 10 of the present invention provides an innovative method of controlling the lift produced by windmill blades and improving the efficiency of the windmill. The system of the present invention also extends the range of wind speeds at which windmills can practically produce energy.

While the controllable camber windmill blades and the system for controlling them have been discussed in the context of windmill systems for producing electrical energy, the system could also be applied to windmills that provide direct mechanical energy, such as a system that drives a water pump. In this alternative application however, a separate electrical supply source would be required to actuate the shape memory alloy members 32.

The system of the present invention may also be applied to water turbines. Still further, the system of the present invention may be applied to optimize the lift on propeller blades for boats, aircraft, fans or liquid pumps.

An alternative embodiment would be to configure the wires in the blade such that there was more curvature when the wires were cool and stretched at low wind speed. At high wind speed, the wires are heated and they contract on the convex side of the curve. This increases the radius of curvature and flattens the shape. This has the effect of decreasing lift on the blade and reduces forces over on blade. This allows the blades to operate at higher wind speed without structural failure.

Another configuration having shape memory wire to be located on both concave and convex sides of the blade. This would allow the radius of curvature of the blade to either increase or decrease from a neutral pressure.

If desired, piezoelectric fibers could be used instead of shape memory alloy wires.

It is apparent that there has been provided in accordance with the present invention controllable camber windmill blades which fully satisfies the means, objects, and advantages set forth hereinbefore. While the present invention has been described in the context of specific embodiments thereof, other alternatives, modifications, and variations will become apparent to those skilled in the art after reading the foregoing description. Accordingly, it is intended to embrace those alternatives, modifications, and variations which fall within the broad scope of the appended claims.

What is claimed is:

1. A power generating system comprising:
   at least two variable camber blades fastened to a rotatable hub, said blades being driven by a fluid;
   each of said variable camber blades including a plurality of shape memory alloy members; and
   a source of electrical power connected to said shape memory alloy members in each blade for supplying electrical power to the shape memory alloy members to change the shape of each said blade in response to changes in the speed of the fluid driving said blades.

2. A power generating system according to claim 1 further comprising:
   a power regulator connected to said source of electrical power for regulating the electrical power being supplied to said shape memory alloy members; and
   a controller for transmitting a power command signal to said power regulator.

3. The power generating system of claim 2 further comprising:
   a sensor embedded in each of the blades for generating a first signal indicative of the shape of each blade, each said sensor measuring the amount of deflection of the blade in which it is embedded; and
   said first signal being transmitted to said controller.

4. The power generating system of claim 3 further comprising:
   a sensor connected to said source of electrical power for generating a second signal indicative of the rotational speed of said electrical power source; and
   said second signal being transmitted to said controller.

5. The power generating system of claim 4 further comprising:
   a sensor for generating a third signal indicative of the speed of said driving fluid; and
   said third signal being transmitted to said controller.

6. The power generating system of claim 5 wherein:
   said hub is mounted to a tower; and
   said third signal generating sensor comprises a wind sensor mounted to said tower for generating a signal indicative of wind speed.

7. The power generating system of claim 5 wherein:
   said hub is mounted to a tower; and
   said third signal generating sensor comprises a wind sensor mounted near said tower for generating a signal indicative of wind speed.

8. The power generating system of claim 5 further comprising:
   a voltage sensor generating a fourth signal indicative of the voltage output of said electrical power source;
   a current sensor generating a fifth signal indicative of the current output of said electrical power source; and
   said fourth and fifth signals being transmitted to said controller.

9. The power generating system of claim 8 wherein said controller generates said power command signal after determining a desired shape for each of said blades in response to at least one of said first, second, third, fourth, and fifth signals.

10. The power generating system of claim 8 wherein said controller generates said power command signal after determining a desired shape for each of said blades in response to at least two of said first, second, third, fourth, and fifth signals.

11. The power generating system of claim 1 wherein said shape memory alloy members are embedded within a flexible composite material.

12. The power generating system of claim 1 further comprising:
   each of said blades having a leading edge and a trailing edge;
   each of said blades further having a power bus located in its leading edge of each said blade and a ground bus in its trailing edge; and
   said power bus and said ground bus in each blade being connected to said shape memory alloy members in said blade.

13. The power generating system of claim 12 wherein each of said blades also has a main spar in the leading edge which runs the length of the blade and said power bus is embedded in said main spar.

14. The power generating system of claim 12 wherein said shape memory alloy members comprises a plurality of wires formed from a shape memory alloy and wherein said wires extend from said power bus in said leading edge to said ground bus in said trailing edge.

15. The power generating system of claim 12 wherein said shape memory alloy members comprises a plurality of sheets formed from a shape memory alloy and wherein said sheets extend from said power bus in said leading edge to said ground bus in said trailing edge.

16. The power generating system of claim 1 further comprising a device for controlling the pitch of each of said blades.

17. The power generating system of claim 1 wherein said blades are driven by the wind and said source of electrical power comprises an electrical generator whose electrical output is generated by rotation of said blades and said hub.

18. The power generating system of claim 17 wherein each of said blades has a higher curvature at a low wind speed to increase the lift of each of the blades and a lower curvature at a high wind speed to decrease the lift of each of the blades.

19. The power generating system of claim 17 wherein the temperature of said shape memory alloy members is increased as wind speed decreases and is allowed to decrease as wind speed increases.

* * * * *